US008644554B2

(12) United States Patent
Hao et al.

(10) Patent No.: US 8,644,554 B2
(45) Date of Patent: Feb. 4, 2014

(54) METHOD, DEVICE, AND COMPUTER-READABLE MEDIUM FOR DETECTING OBJECT IN DISPLAY AREA

(75) Inventors: Ying Hao, Beijing (CN); Tao Li, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 268 days.

(21) Appl. No.: 13/164,027

(22) Filed: Jun. 20, 2011

(65) Prior Publication Data

US 2012/0008829 A1    Jan. 12, 2012

(30) Foreign Application Priority Data

Jul. 6, 2010  (CN) .......................... 2010 1 0218150

(51) Int. Cl.
G06K 9/00 (2006.01)
G06K 7/00 (2006.01)
H04N 5/33 (2006.01)

(52) U.S. Cl.
USPC ............................ 382/103; 382/312; 348/169

(58) Field of Classification Search
USPC ......... 382/103, 167, 218, 274–275, 305, 312, 382/284, 294; 348/128, 169, 177; 701/36; 358/518, 521
See application file for complete search history.

(56) References Cited

U.S. PATENT DOCUMENTS

| 6,064,429 | A | * | 5/2000 | Belk et al. | 348/128 |
| 7,576,767 | B2 | * | 8/2009 | Lee et al. | 348/36 |
| 7,674,052 | B2 | * | 3/2010 | Hirooka et al. | 396/439 |
| 8,306,280 | B2 | * | 11/2012 | Nozaki et al. | 382/118 |
| 8,332,097 | B2 | * | 12/2012 | Chiba et al. | 701/36 |
| 2009/0103780 | A1 | | 4/2009 | Nishihara et al. | |
| 2009/0115721 | A1 | | 5/2009 | Aull et al. | |

OTHER PUBLICATIONS

Aditi Majumder, "A Practical Framework to Achieve Perceptually Seamless Multi-Projector Displays", Doctor Thesis, 2003, 147 pages.

* cited by examiner

*Primary Examiner* — Kanjibhai Patel
(74) *Attorney, Agent, or Firm* — Oblon, Spivak, McClelland, Maier & Neustadt, L.L.P.

(57) ABSTRACT

Disclosed are a method and a device for detecting an object in a display area. The method comprises a step of generating a first image prepared to be displayed; a step of displaying the generated first image on a screen; a step of capturing a second image of the screen including the display area; and a step of comparing the generated first image with the captured second image so as to detect the object in the display area.

11 Claims, 11 Drawing Sheets

FIG.8
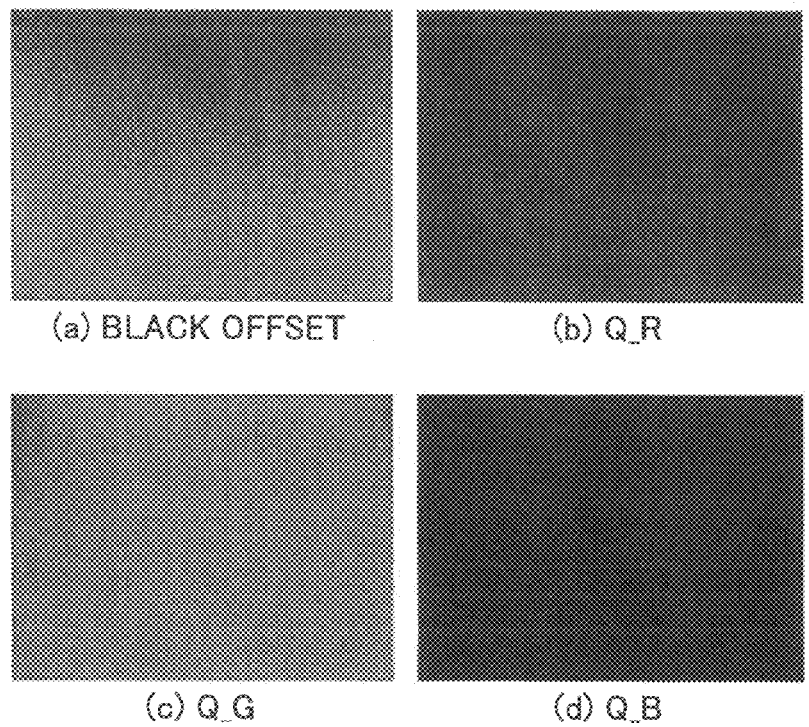
(a) BLACK OFFSET  (b) Q_R
(c) Q_G  (d) Q_B
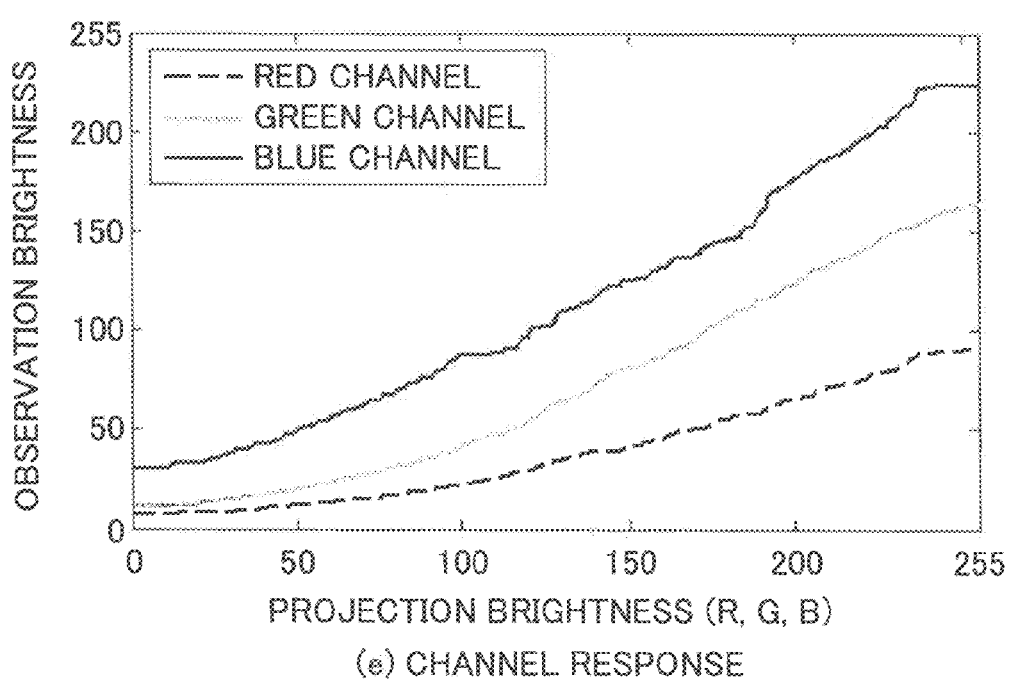
(e) CHANNEL RESPONSE FIG.9
Research & Development
Department (R&D)
(a)
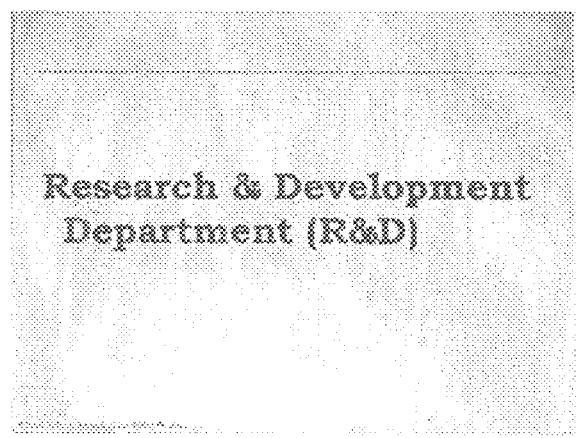
(b)
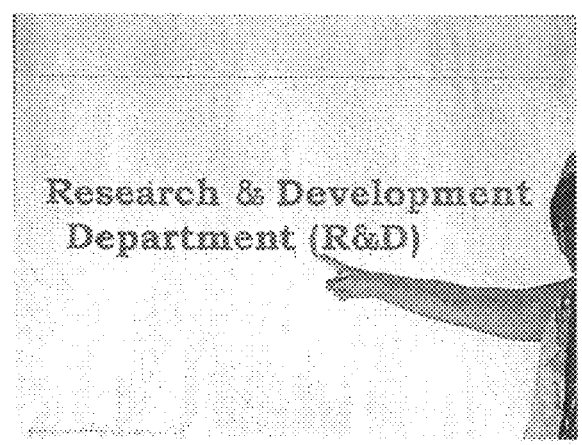
(c)

(a) DIFFERENCE IMAGES
(b) BINARY IMAGE PROCESSING BASED ON BRIGHTNESS
(c) BINARY IMAGE PROCESSING BASED ON RESPECTIVE CHANNELS

METHOD, DEVICE, AND COMPUTER-READABLE MEDIUM FOR DETECTING OBJECT IN DISPLAY AREA

BACKGROUND OF THE INVENTION

1. Field of the Invention

The present invention generally relates to the field of video analysis, and particularly relates to a method, a device, and a computer-readable medium for detecting at least one object in a display area.

2. Description of the Related Art

In a presentation or a meeting, a device such as a projection screen or a wide-screen display is usually used for displaying relevant contents. In a case where a projection system is taken as an example, intelligent interaction with projection contents is strongly required as projection devices are in widespread use in offices. In general, a user adopts a computer connected to the projection device to realize the interaction. However, in order to realize the interaction, the user needs to walk back and forth between the computer and the projection device so as to control the projection contents, for example, to turn a page. Although it is possible to utilize a USB device to achieve remote page turning, this kind of function is too simple; as a result, the requirement of complicated interaction cannot be satisfied.

At present, it is possible to simulate a touch panel by employing video analysis according to the most recent development of computer vision. In particular, if a presenter puts (inserts) an object such as his finger, a rod, etc. into a display area of a projection screen, then it is possible to calculate positional information of the object by using video analysis; the positional information is continuously fed back to a computer so as to able to use the positional information of the object to trigger a predetermined event. Since the inserted object may be influenced by continuous and unpredictable projection contents, it is difficult to carry out accurate and real time positioning of the inserted object by utilizing this technique.

In the below cited reference No. 1, a system in which an infrared light source is used to send infrared light toward a human hand is disclosed. However, since hardware configurations in the system are complicated, the system may not be applied to a general presentation environment.

In the below cited reference No. 2, a hand gesture recognition system is disclosed in which a dedicated projector able to alternately send visible light and infrared light is adopted. However, it may cost much money to buy the dedicated projector for a user.

Furthermore, in the below cited reference No. 3, a method of achieving perceptually seamless multi-projector displays is disclosed. However, in an area with low brightness, noise may be introduced in a predictable image when using the method.

Therefore a method and a device by which at least one inserted object in a display area such as a projection screen may be detected conveniently, easily, accurately, timely, and relatively cheaply are desirable.

Cited Reference No. 1: US Patent Application Publication NO. 2009/0103780 A1

Cited Reference No. 2: US Patent Application Publication NO. 2009/0115721 A1

Cited Reference No. 3: Aditi Majumder, "A Practical Framework to Achieve Perceptually Seamless Multi-Projector Displays" (Doctor Thesis, 2003)

SUMMARY OF THE INVENTION

In order to solve the above described problems in the conventional techniques, in embodiments of the present invention, a method and a device for detecting at least one object (for example, an inserted object) in a display area by comparing original visual contents (i.e., an original image) with captured contents (i.e., a captured image) are provided. Since only information of the visible spectrum is utilized, it is not necessary to use extra hardware. At the same time, since there is no strong limit for a relative position between an imaging unit and a display unit, it is relatively easy to achieve a configuration.

Furthermore, in an embodiment of the present invention, a new color transformation method of simulating an image captured by a camera head based on an original image is provided too. This method takes account of a few important properties of an imaging system, for example, unevenness of a projection screen and a black offset of a projection unit and an imaging unit; as a result, it is possible to better simulate a colorful image captured by the camera head. Based on a difference between a simulated image obtained by the camera head (or a projector) and an actually-captured image, it is possible to effectively enhance at least one object inserted into a display area. And by carrying out binary image processing with regard to a difference image of the two, it is possible to obtain a mask image including background and foreground.

According to one aspect of the present invention, an object detection method of detecting at least one object in a display area is provided. The object detection method comprises a step of generating a first image prepared to be displayed; a step of displaying the generated first image on a screen; a step of capturing a second image of the screen including the display area; and a step of comparing the generated first image with the captured second image so as to detect the object in the display area.

Furthermore, according to an embodiment of the present invention, the comparison between the generated first image and the captured second image may include a step of correcting color of the generated first image by using at least one of the following parameters: a black offset representing a captured non-all-black image when a generated image is all black; screen unevenness degree representing unevenness degree of a captured image when a generated image is even; and a channel brightness response representing a correspondence relationship between brightness of a generated image and brightness of a captured image.

Furthermore, according to an embodiment of the present invention, the black offset is calculated by generating an all-zero image; the screen unevenness degree is calculated by generating at least one one-channel maximum brightness image; and the channel brightness response is calculated by generating at least one one-channel grayscale image.

Furthermore, according to an embodiment of the present invention, unevenness degree of a captured image is simulated by multiplying a generated image by the screen unevenness degree.

Furthermore, according to an embodiment of the present invention, the channel brightness response is represented in a continuous or discrete manner.

Furthermore, according to an embodiment of the present invention, the screen unevenness degree and the channel rightness response are correlated with one channel or three channels.

Furthermore, according to an embodiment of the present invention, when all of the black offset, the screen unevenness degree, and the channel brightness response are utilized, the color of the generated first image is corrected according to the following steps: (1) a step of applying the channel brightness response to the generated first image; (2) a step of multiplying an image obtained in STEP (1) by the screen unevenness degree; and (3) a step of adding the black offset into an image obtained in STEP (2).

Furthermore, according to an embodiment of the present invention, the comparison between the generated first image and the captured second image may include a step of carrying out binary image processing according to respective channels, and combining results of the binary image processing carried out according to the respective channels by using a logical OR operation.

Furthermore, according to an embodiment of the present invention, a predetermined event is triggered based on a property of the detected object.

According to another aspect of the present invention, an object detection device for detecting at least one object in a display area is provided. The device comprises an image generation unit for generating a first image prepared to be displayed; a display unit for displaying the generated first image on a screen; an image capture unit for capturing a second image of the screen area including the display area; and a calculation unit for comparing the generated first image with the captured second image so as to detect the object in the display area.

According to still another aspect of the present invention, a non-transitory computer-readable medium is provided. The non-transitory computer-readable medium has machine-executable instructions for execution by a processing system. The machine-executable instructions are used for carrying out a method of detecting at least one object in a display area, and the machine-executable instructions, when executed, cause the processing system to carry out a step of generating a first image prepared to be displayed; a step of displaying the generated first image on a screen; a step of capturing a second image of the screen area including the display area; and a step of comparing the generated first image with the captured second image so as to detect the object in the display area.

As a result, according to the embodiments of the present invention, by using the method and the device, it is possible to achieve timely and accurate object detection without complicated configurations and extra devices so that it is possible to carry out various kinds of interaction during a period of use, and bring about convenience to a user.

BRIEF DESCRIPTION OF THE DRAWINGS

FIG. 8 illustrates examples of a black offset, screen unevenness degrees $Q\_R$, $Q\_G$, and $Q\_B$, and channel brightness responses $LUT\_R$, $LUT\_G$, and $LUT\_B$ obtained by experiment according to an embodiment of the present invention.

FIG. 9 illustrates examples of an original image, a simulated image, and an image captured by an imaging unit according to an embodiment of the present invention.

DETAILED DESCRIPTION OF THE PREFERRED EMBODIMENTS

Hereinafter, various embodiments of the present invention will be concretely described with reference to the drawings.

Here it should be noted that the same symbols, which are in the specification and the drawings, stand for constructional elements having the same or basically-same function and structure, and repeated explanations for the constructional elements are omitted in the specification.

In addition, although a projection system is taken as an example in the specification for describing the embodiments of the present invention, the present invention is not limited to the projection system. In other words, the present invention may be applied to any proper technical field, for example, the field of a flat panel display system.

Figure 1:
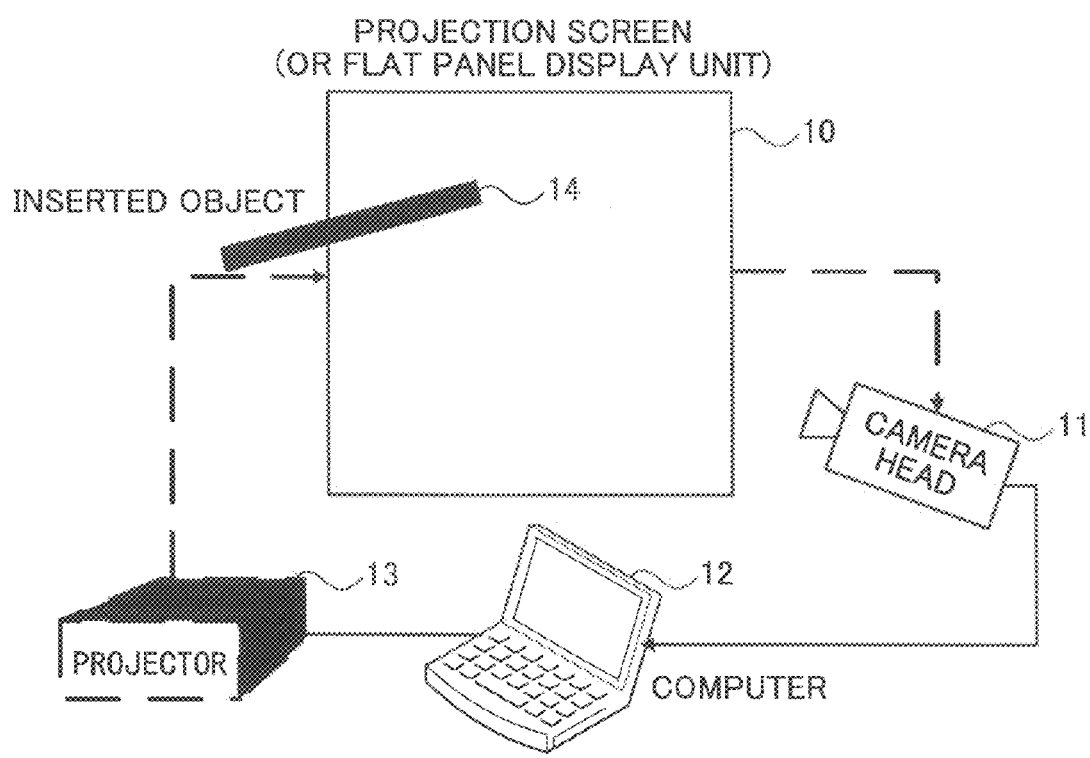
FIG. 1 illustrates a projection system used in an embodiment of the present invention.

In what follows, a projection system used in an embodiment of the present invention is illustrated by referring to FIG. 1.

FIG. 1 illustrates a projection system used in an embodiment of the present invention.

In general, visual contents may be projected on a projection screen, and may also be projected on a flat panel display unit. As shown in FIG. 1, the projection system includes a projection screen (or a flat panel display unit) 10, a camera head 11, a computer 12, and a projector 13. The computer 12 generates original visual contents prepared to be displayed; the original visual contents are displayed on the projection screen (or the flat panel display unit) 10 by using the projector 13 connected to the computer 12. The camera head 11 captures an image of the projection screen (or the screen of the flat panel display unit) 10 on which the visual contents are projected, and feeds the captured image back to the computer 12. In a case where an predetermined object that may be a real object (for example, a human hand, a human finger, a pen, and a rod) or a virtual object (for example, a shadow of the real object) is put (inserted) in a display area of the projection screen 10, the computer 12 detects various properties of the predetermined object 14 (for example, position information, size information, and shape information) by comparing the original image and the captured image based on an object detection method or an object detection device according to the embodiments of the present invention so as to determine an event that will be triggered later.

Figure 2:
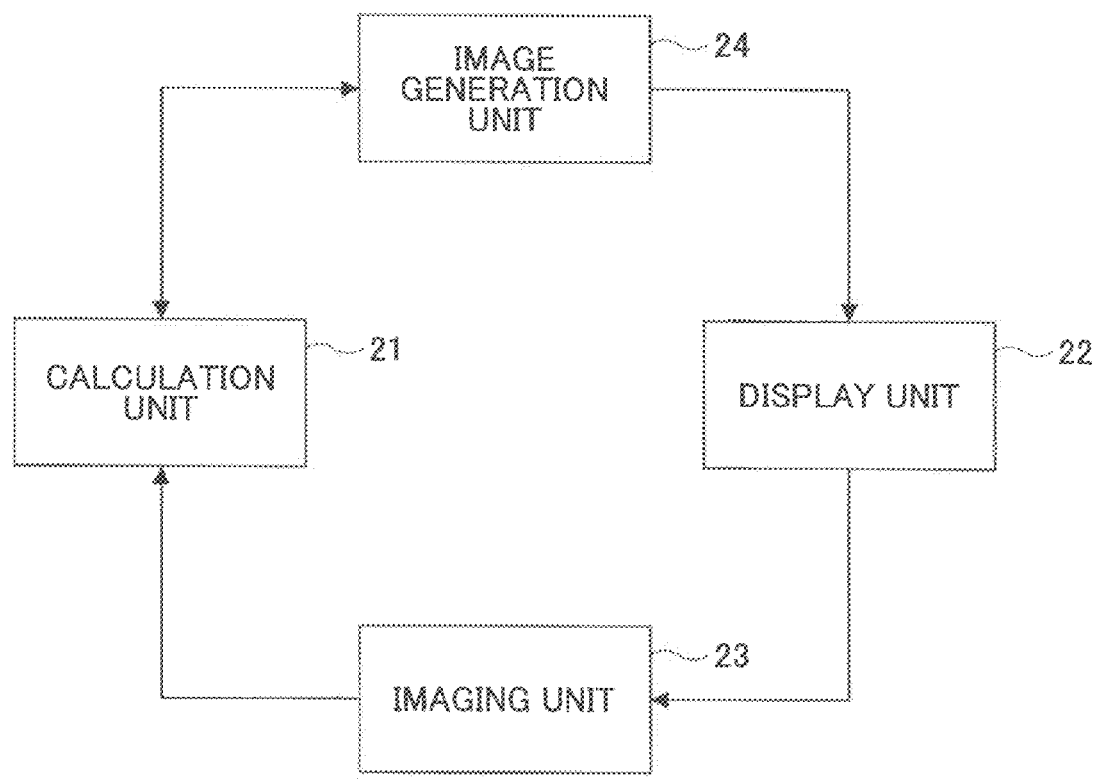
FIG. 2 is a block diagram of an object detection device for detecting at least one object in a display area according to an embodiment of the present invention.

In what follows, an object detection device for detecting at least one object in a display area according to an embodiment of the present invention is illustrated by referring to FIG. 2.

FIG. 2 is a block diagram of an object detection device for detecting at least one object in a display area according to an embodiment of the present invention.

As shown in FIG. 2, the object detection device comprises an image generation unit 24 for generating an original image prepared to be displayed; a display unit 22 for displaying the original image generated by the image generation unit 24 on a screen such as the projection screen (or the screen of the flat panel display unit) 10; an imaging unit 23 for capturing an image of the screen, and outputting the captured image to a calculation unit 21, wherein, the captured image may or may not include the inserted object 14 shown in FIG. 1; and the calculation unit 21 for receiving the original image and the captured image from the image generation unit 24 and the imaging unit 23, respectively, and comparing the original image with the captured image so as to determine whether the inserted object 14 exists and properties of the inserted object 14 if it exists. The properties of the inserted object 14 may cause the calculation unit 21 to carry out a predetermined instruction so as to achieve interaction with the image generation unit 24.

For example, if it is determined that the inserted object 14 is located at a button area on a slide, then a function corresponding to the button, for example, "page tuning", "forward", or "backward", is carried out. Here it is preferred that the corresponding function is triggered when determining that the inserted object 14 has been located at the button area for a predetermined period of time.

Figure 3:
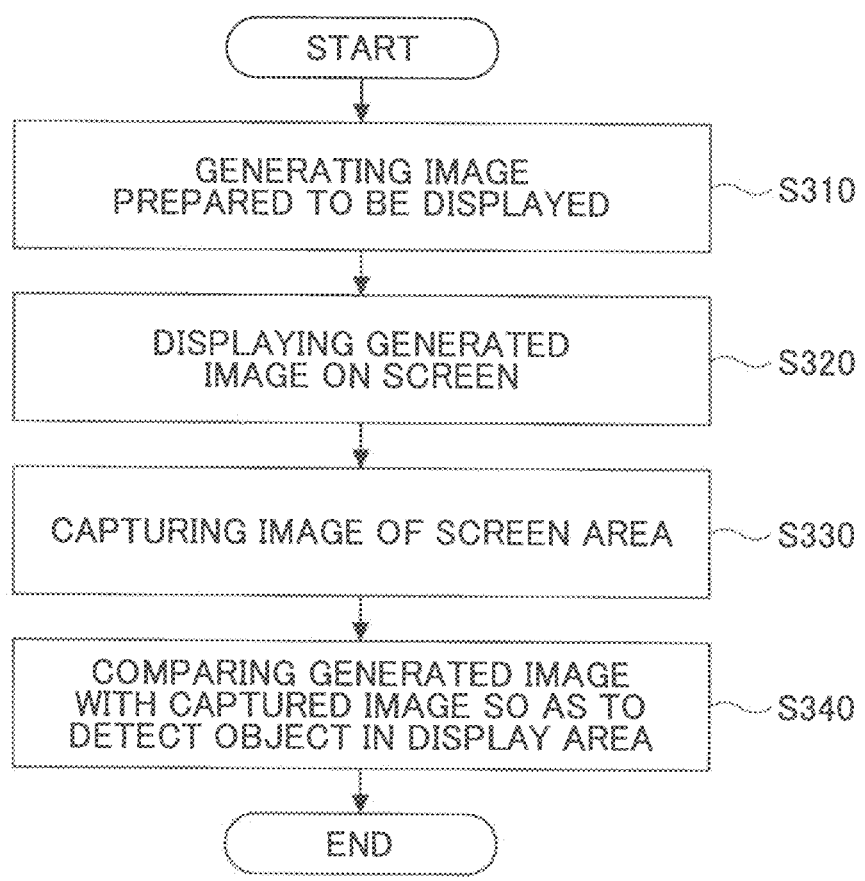
FIG. 3 is a flowchart of an object detection method of detecting at least one object in a display area according to an embodiment of the present invention.

In what follows, an object detection method of detecting at least one object in a display area according to an embodiment of the present invention is illustrated by referring to FIG. 3.

FIG. 3 is a flowchart of an object detection method of detecting at least one object in a display area according to an embodiment of the present invention.

As shown in FIG. 3, in STEP S310, an original image prepared to be displayed is generated. For example, the generated original image may be a slide for presentation. In STEP S320, the generated original image is displayed on a screen. Here it should be noted that the generated original image may be displayed on a projection screen or a screen of a flat panel display unit. And in a case where a projection system is utilized, the generated original image may even be directly projected on, for example, a wall or a floor. However, the present invention is not limited to these; in other words, those skilled in the art may use other things on which the generated original image may be displayed. In STEP S330, an image of the screen area where the generated original image is displayed in a display area is captured. Here it should be noted that it is possible to capture the image of the screen area while the generated original image is displayed on the screen area. In addition, it is preferred to capture the image of the screen area according to a predetermined time interval (for example, 100 ms) so as to timely obtain the image of the screen area. In STEP S340, the generated original image and the captured image are compared. Here the comparison means that a difference of the generated original image and the captured image is calculated; in this way, an inserted object may be detected. As a result, by carrying out the comparison, it is possible to effectively enhance an object inserted into a display area so that the inserted object can be detected effectively and accurately.

However, due to cooperative action of the display unit 22 (for example, in a projector) and the imaging unit 23 (for example, in a camera head) shown in FIG. 1, there may be a color difference and a geometric difference between original visual contents (i.e., an original image) and an image captured by the imaging unit 23. For example, in a case where optical systems utilized by the display unit 22 and the imaging unit 23 are different, i.e., the display unit 22 utilizes an optical system (for example, a set of lens) to project an original image on a screen, and the imaging unit 23 utilizes another optical system to capture the original image projected on the screen, there may be a relative geometric difference (for example, shape distortion) between an original image and a captured image. In addition, the size of a display area for displaying an original image in a captured image may be different from the size of the real original image; this is another kind of geometric difference. The geometric difference may usually be corrected by adopting a method such as interpolation, etc. On the other hand, the color difference generally consists of two parts. A first part is an image difference generated when an original image is displayed on a screen; this kind of the image difference is cooperatively generated by the original visual contents and the hardware properties of the display unit 22. And a second part is an image difference generated when the imaging unit 23 captures an image of a display area; this kind of the image difference is generated by the hardware properties of the imaging unit 23. Furthermore the imaging unit 22 may have functions such as white balance, gain adjustment, eye sensing optimization, etc.; all of these may influence a finally captured image.

As a result, since the geometric correction and the color correction are not carried out in the above described embodiment, there is a disadvantage that is it is impossible to detect the inserted object accurately.

In order to overcome the disadvantage, in an embodiment of the present invention, before comparing original visual contents (i.e., an original image) and a captured image, geometric correction and color correction are carried out with regard to the original image first. It should be noted that the geometric correction may be realized by adopting various conventional techniques, for example, a projection transformation method. Since the geometric correction is well known by those skilled in the art, its concrete description is omitted here.

In what follows, an object detection method adopting color correction according to an embodiment of the present invention is illustrated.

Figure 4:
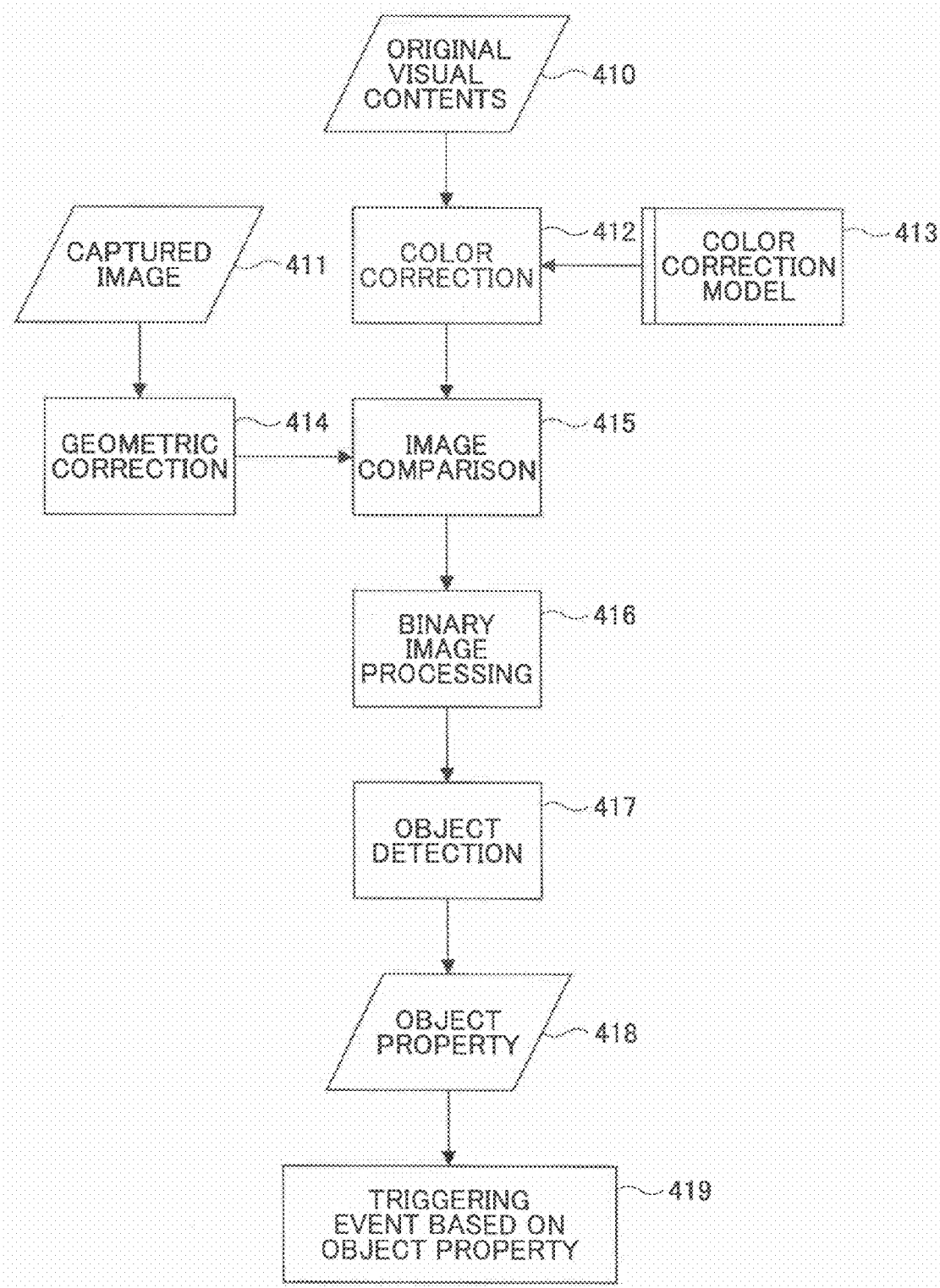
FIG. 4 is a flowchart of an object detection method of detecting at least one object in a display area by using color correction according to an embodiment of the present invention.

FIG. 4 is a flowchart of an object detection method of detecting at least one object in a display area by using color correction according to an embodiment of the present invention.

As shown in FIG. 4, in STEP 412, a color correction model 413 is utilized to carry out color correction with regard to original visual contents (i.e., a generated original image) 410 so that the corrected original image may be close to an actually captured image 411 in color. In STEP 414, geometric correction is carried out with regard to the captured image 411 so that contents displayed in a display area may be close to the original visual contents in size and shape. Then, in STEP 415, the original visual contents after receiving the color correction and the captured image after receiving the geometric correction are compared. Here the comparison may be obtaining a difference image of the two, and in general, retained in the difference image are different pixels between the two. In STEP 416, binary image processing is applied to the difference image so as to obtain background and at least one area of concern (for example, a human finger area, a rod area). The background is usually represented by 0, and the area of concern is usually represented by 1. In STEP 417, by carrying out further processing with regard to a binary image obtained in STEP 416, at least one object property 418 of the area of concern in the binary image is detected. Finally, in STEP 419, a predetermined event is triggered according to the object property 418.

In what follows, processing of carrying out the color correction with regard to original visual contents (i.e., a generated original image) according to an embodiment of the The color correction of the original image is based on a complicated multi-dimensional non-linear random function that relates to but is not limited to a Gamma transform, a working principle, a display screen adopted in the display unit 22, features and configurations of the imaging unit 23, and environmental light; and also relates to color regions of the display unit 22 and the imaging unit 23. However, since to achieve object detection is the only aim here, it is not necessary to build the above mentioned entire complicated function; that is, only an approximate model that may be solved is necessary. In this embodiment, a color correction model includes three parameters that are a black offset, screen unevenness degree Q_(R/G/B), and a channel brightness response LUT_(R/G/B). However, the present invention is not limited to these; that is, it is also possible to use any other proper parameters.

1. Black Offset

Due to hardware configurations of the imaging unit 23 and the display unit 22, a response of the imaging unit 23 to an all-zero (i.e., all-black) original image is often non-zero. The non-zero response may be caused by the imaging unit 23. For example, when the imaging unit 23 is set to a specific white balance mode, a captured all-zero original image may tend to be red or blue. The non-zero response may also be caused by environmental light or texture of a display screen itself. And the non-zero response may further be caused by light leak of a projector. These factors may generate various non-zero responses to an all-zero original image in various combinations. These kinds of non-zero responses are called black offsets.

Although the generation of the black offset is relatively complicated, its estimation is relatively simple. For example, it is possible to carry out the estimation by controlling the image generation image 24 to generate a non-zero image and then letting the imaging unit 23 obtain (capture) a non-zero image; a value of a pixel in the non-zero image is the black offset of that pixel. Here it is preferred to calculate average values or intermediate values of pixels in a non-zero image by calculating multiple times so as to obtain more robust estimation.

2. Screen Unevenness Degree

In an ideal display unit, brightness values of any two of respective channels (R, G, B) are mutually independent, and do not mutually affect each other. However, in actual practice, since there is a black offset, the assumption of the channel independence is often not correct. In some cases, brightness values of respective channels after subtracting black offsets may be approximately independent, but in some cases, this kind of approximation may cause a big simulation error. As a result, in this embodiment, it is assumed that screen unevenness degree and a channel brightness response may be relevant to one channel or three channels (corresponding to a case where the channels are not independent).

When a projector is used as the display unit 22, it may cause an even original image to generate uneven color/brightness. This phenomenon is caused by a working principle of a bulb in the projector. In what follows, processing of estimating the screen unevenness degree according to this embodiment is illustrated by referring to FIG. 5.

Figure 5:
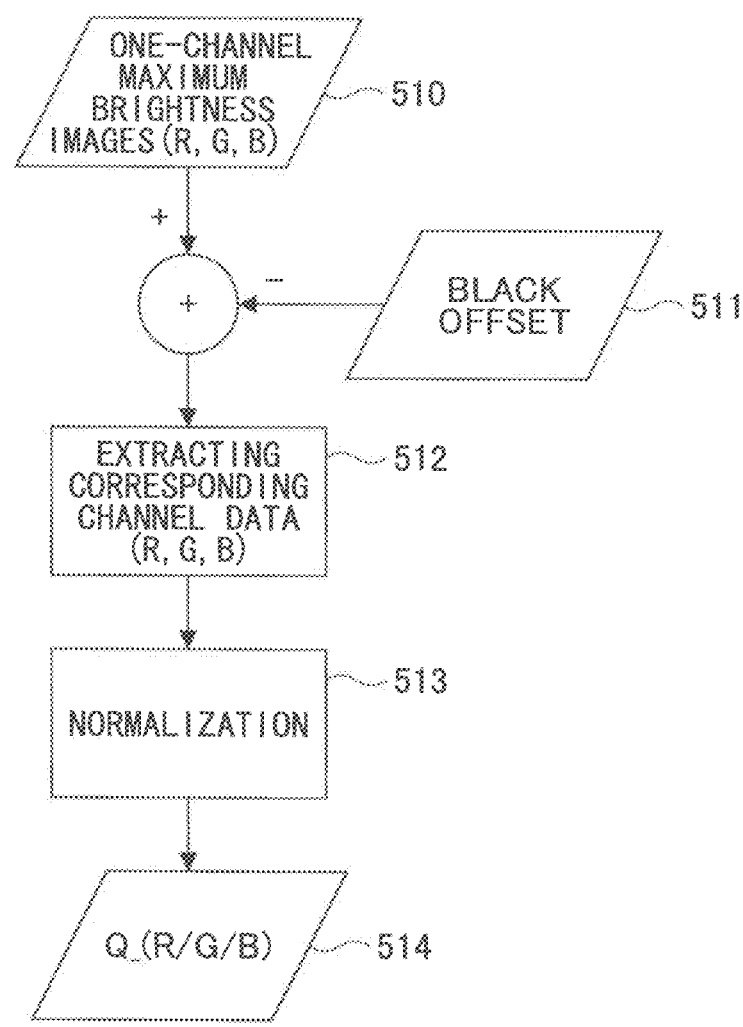
FIG. 5 is a flowchart of a method of estimating screen unevenness degrees of respective channels according to an embodiment of the present invention.

FIG. 5 is a flowchart of a method of estimating screen unevenness degrees of respective channels according to an embodiment of the present invention.

In STEP 510, the image generation unit 24 generates a predetermined number of one-channel maximum brightness images in which brightness values of channels of concern (R channels, G channels, or B channels) are the maximum channel value, and brightness values of other channels are 0. For example, if a red channel is taken as an example, the one-channel maximum brightness image is an image in which brightness values of red channels in respective pixels are maximum (for example, 255), and brightness values of other channels in the respective pixels are 0. In STEP 511, a black offset is subtracted. Then, in STEP 512, data of the respective channels are separated. If the respective channels are approximately independent, then the red (R), green (G), and blue (B) channels may be processed individually; otherwise an average brightness value of the channels should be calculated. Finally, in STEP 513, unevenness degree Q_(R/G/B) of a display area is obtained by carrying out normalization with regard to the above described selected channel data. The normalization is nonlinear; that is, the channel data is divided by its maximum value. For example, in a case where a red (R) channel is taken as an example, if it is assumed that $I_R$ represents a result of subtracting a black offset from an image in which brightness values of red channels are maximum, and $M_R$ represents a corresponding captured image, due to unevenness of brightness, the brightness values of any two points (x, y) and (x', y') in $M_R$ are different; as a result, the unevenness degree Q_R(x, y) of the point (x, y) is equal to $M_R(x, y)/I_R(x, y)$, i.e., $Q\_R(x, y)=M_R(x, y)/I_R(x, y)$.

Preferably, in an actual application, in order to obtain a more reliable result, it is possible to calculate screen unevenness degree plural times with regard to a predetermined channel, and then calculate an average value or an intermediate value of them so as to obtain a more robust result.

Here, in order to simply illustrate, an image having 3×3 pixels is taken as an example, and it is assumed that any two of the channels in the image are mutually independent. If it is assumed that a generated one-channel maximum brightness image (for example, $I_R$) is $$I_R = \begin{bmatrix} 255 & 255 & 255 \\ 255 & 255 & 255 \\ 255 & 255 & 255 \end{bmatrix}, \quad (1)$$

and it is assumed that a black offset is $$B_{Offset} = \begin{bmatrix} 45 & 35 & 25 \\ 35 & 25 & 45 \\ 35 & 45 & 25 \end{bmatrix}, \quad (2)$$

then a result of subtracting the black offset from the one-channel maximum brightness image is $$I'_R = \begin{bmatrix} 210 & 220 & 230 \\ 220 & 230 & 210 \\ 220 & 210 & 230 \end{bmatrix}. \quad (3)$$

Next, by carrying out normalization processing with regard to the result (3), screen unevenness degree $$Q\_R = \begin{bmatrix} 21/23 & 22/23 & 1 \\ 22/23 & 1 & 21/23 \\ 22/23 & 21/23 & 1 \end{bmatrix} \quad (4)$$

is obtained. The screen unevenness degree, when used, may be multiplied by corresponding pixel values of an input image (an original image). For example, if a generated original image is $$I_{original} = \begin{bmatrix} 200 & 200 & 200 \\ 200 & 200 & 200 \\ 200 & 200 & 200 \end{bmatrix}, \quad (5)$$

then a simulated image obtained by employing the screen unevenness degree is $$I_{out} = \begin{bmatrix} 200 \times 21/23 & 200 \times 22/23 & 200 \times 1 \\ 200 \times 22/23 & 200 \times 1 & 200 \times 21/23 \\ 200 \times 22/23 & 200 \times 21/23 & 200 \times 1 \end{bmatrix}. \quad (6)$$

3. Channel Brightness Response

Estimation of a channel brightness response LUT_(R/G/B) adopts similar steps of estimating the screen unevenness degree. In what follows, processing of estimating a channel brightness response according to an embodiment of the present invention is illustrated in detail by referring to FIG. 6.

Figure 6:
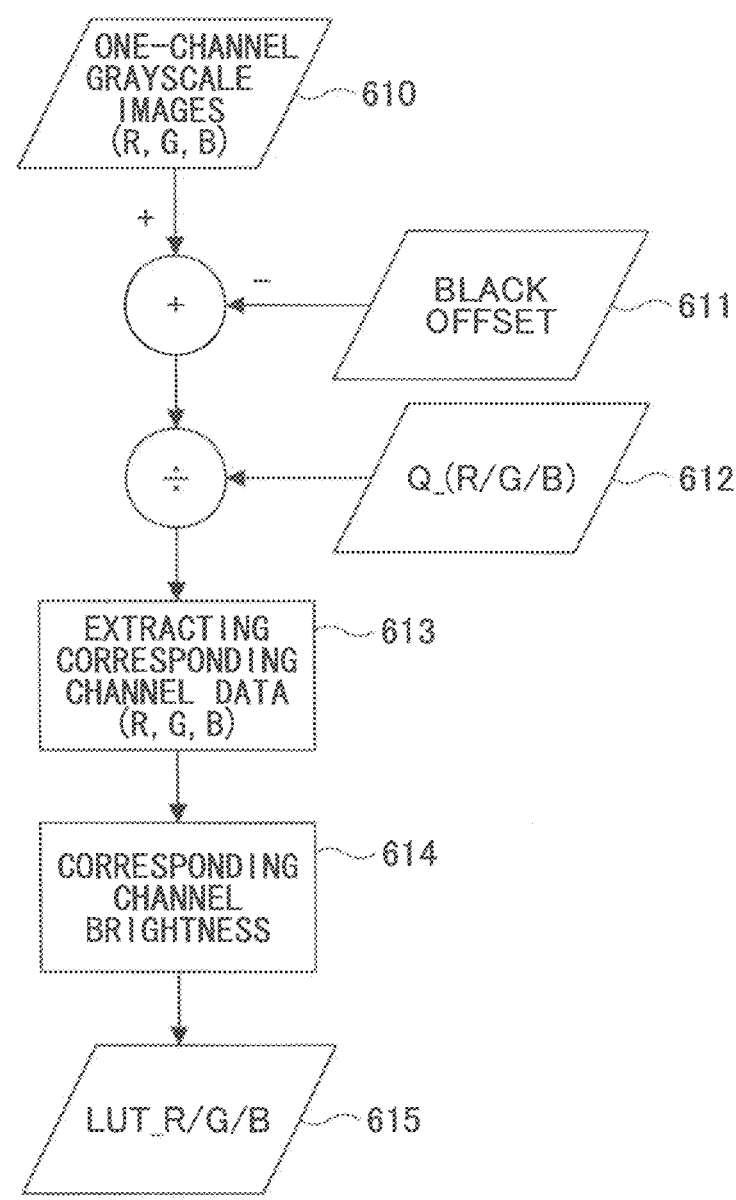
FIG. 6 is a flowchart of a method of estimating channel brightness responses of respective channels according to an embodiment of the present invention.

FIG. 6 is a flowchart of a method of estimating channel brightness responses of respective channels according to an embodiment of the present invention.

As shown in FIG. 6, in STEP 610, the image generation unit 24 generates a predetermined number of one-channel grayscale images. The so-called one-channel grayscale image refers to an image that is divided into plural image segments; the size of each image segment and the number of the image segments are decided based on the needed color accuracy. For example, if each channel is represented by an 8-digit integer, then the number of the image segments are 256 ($2^8$) corresponding to 256 brightness values from 0 to 255. The brightness values of the respective image segments in a channel of concern (for example, selected from 0 to 255) are distributed in a random or predetermined manner in the whole image, and brightness values of other channels are set to 0.

In STEP 611, a black offset is subtracted from the one-channel grayscale images, respectively. In STEP 612, results obtained in STEP S611 are divided by screen unevenness degrees Q_(R/G/B), respectively. Then, in STEP 613, data of the respective channels are extracted, and the channel of concern is selected. In STEP 614, preferably it is possible to obtain a channel brightness response LUT_R/G/B of the whole system with regard to the various brightness values by carrying out robust estimation (i.e., obtaining an average or intermediate value by calculating multiple times) with regard to the image segments having the various brightness values.

If the respective channels are approximately independent, it is possible to only choose the channel of concern, and the finally generated response data is also relevant to one-channel; otherwise data of all the channels is retained, and the finally generated response data is relevant to three channels. In a word, the channel brightness response refers to a correspondence relationship between the brightness values of the generated original image and those of the captured image; it may be represented by a continuous curve, and may also be represented by a look-up table in a case where input and output are discrete values (finite values) (for example, integer values from 0 to 255).

In an actual application, according to a concrete circumstance, it is possible to adopt at least one of the black offset, the screen unevenness degree Q_(R/G/B), and the channel brightness response LUT_(R/G/B); the three parameters, when used, may be independent.

Figure 7:
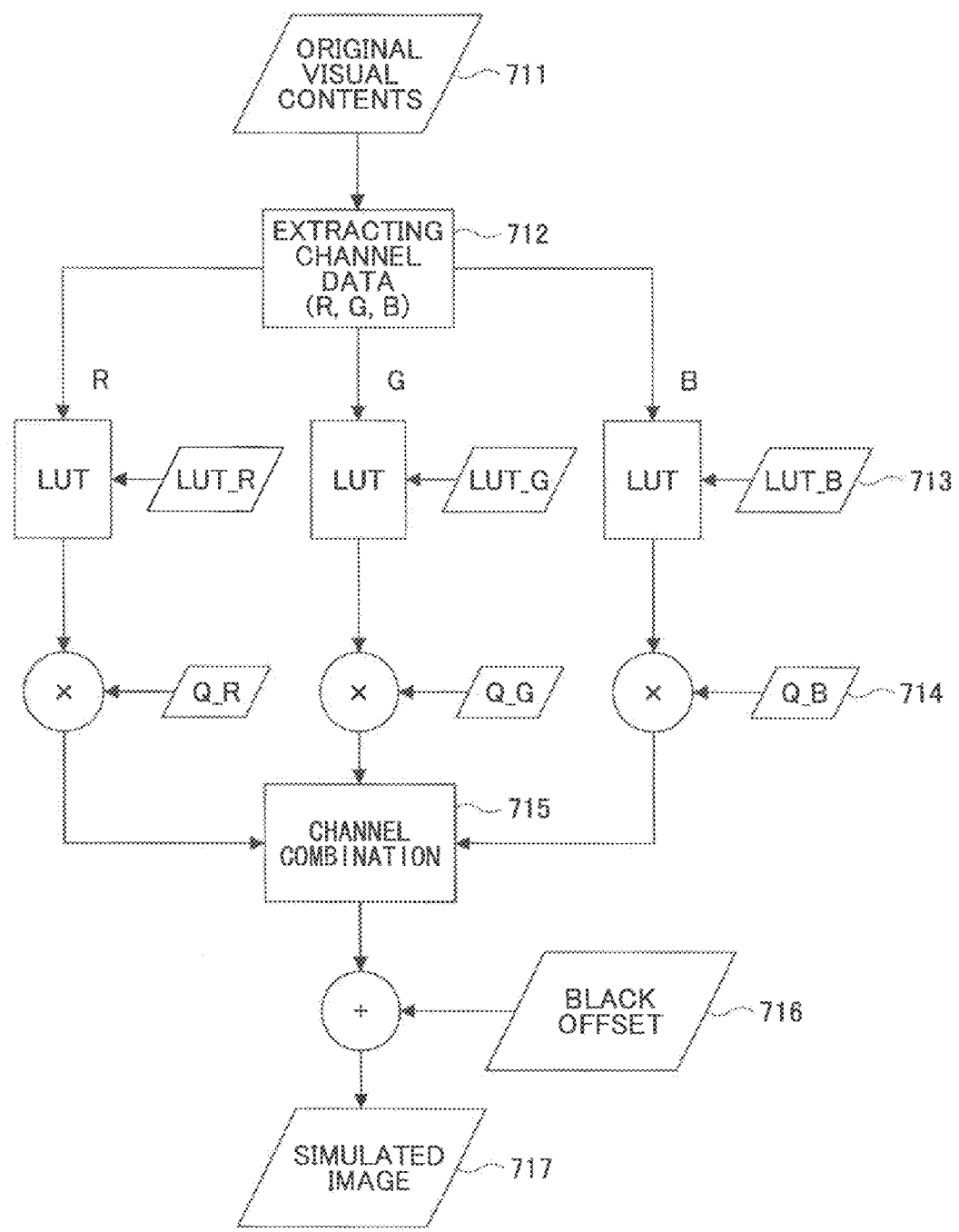
FIG. 7 is a flowchart of a method of simulating a captured image based on an original image by utilizing a color correction model according to an embodiment of the present invention.

An example in which all of the three parameters are used is illustrated in FIG. 7.

FIG. 7 is a flowchart of a method of simulating a captured image based on an original image by utilizing a color correction model according to an embodiment of the present invention.

Preferably, in STEP 711, it is assumed that the image generation unit 24 generates an original image (original visual contents) in a time point T. In STEP 712, data of respective channels is extracted. In STEP 713, brightness of a captured image is estimated by using a channel brightness response LUT_R/G/B. In STEP 714, the respective channels are multiplied by screen unevenness degree Q_R/G/B. In STEP 715, the three channels are combined again. In STEP 716, a black offset is added. In STEP 717, a simulated image is obtained.

Here it should be noted that the aim of extracting the data of the respective channels (i.e., separating the respective channels) is to carry out simple calculation. As a result, in other embodiments, it is also possible not to separate the channels. In other words, the present invention is not limited to this; it is possible to omit STEPS 712 and 715 according to the demand of design.

In addition, the same order of the above described steps is not always necessary; however, according to experiments, this kind of order may bring about a good correction effect so as to better simulate a captured image.

FIG. 8 illustrates examples of a black offset, screen unevenness degrees Q_R, Q_G, and Q_B, and channel brightness responses LUT_R, LUT_G, and LUT_B obtained by experiment according to an embodiment of the present invention.

In FIG. 8, the black offset tends to be red due to configurations of the used display unit and imaging unit. After the black offset is subtracted, the respective channels are approximately independent, and it is found that the screen unevenness degrees Q_R, Q_G, and Q_B of the respective channels are different; that is, the used projection system has different properties with regard to the respective channels. Since any two of the respective channels are mutually independent, any two of the obtained channel brightness responses LUT_R, LUT_G, and LUT_B are mutually independent too.

FIG. 9 illustrates examples of an original image, a simulated image, and an image actually captured by an imaging unit according to an embodiment of the present invention.

In FIG. 9, the simulated image (b) is obtained by applying a color correction model estimated based on FIG. 8 to the original image (a), and the image (c) is actually captured by the imaging unit 23. It is apparent according to FIG. 9 that the simulated image (b) is more easily compared with the actually captured image (c) than the original image (a). And this becomes the basis of detecting objects by utilizing an image difference.

As shown in FIG. 4, after the image comparison (415) is executed, it is necessary to carry out binary image processing so as to divide the image into background and at least one area of concern. In a fore-projection case (i.e. a case where a projector projects contents on a screen located before the projector), projection contents may be projected on an inserted object; as a result, the appearance of the inserted object may be influenced by the projection contents. For example, in a case where very dark color is projected on the object, since resolutions of a projection system and an imaging system are relatively small in a low brightness range, a difference between a predicted image and an actually captured image is relatively small too; as a result, an outline of an inserted object in a difference image may be destroyed (for example, as shown in difference images (a) of FIG. 10).

Figure 10:
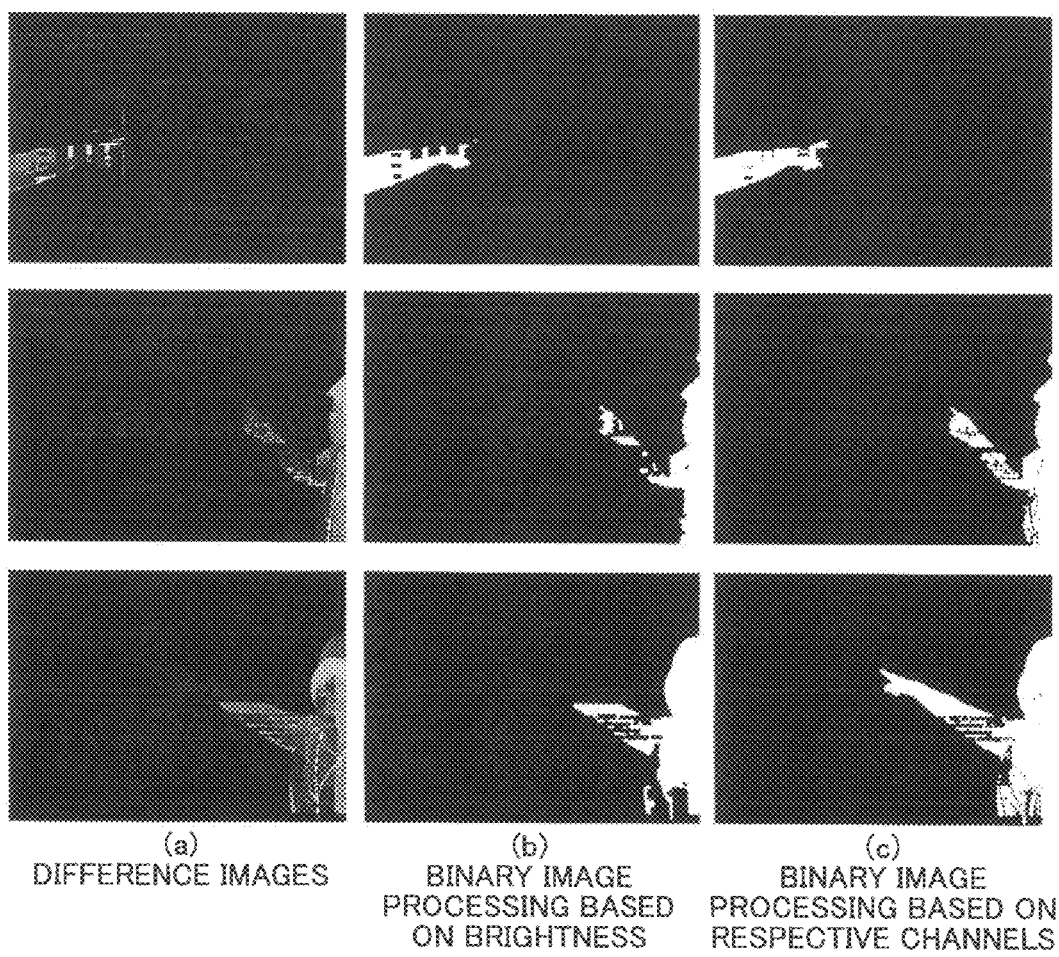
FIG. 10 illustrates comparison results when binary image processing based on brightness and binary image processing based on respective channels are respectively applied to object detection.

FIG. 10 illustrates comparison results when binary image processing based on brightness and binary image processing based on respective channels are applied to object detection.

In FIG. 10, objects inserted into display areas are parts of a human body. In the difference images (a), contrasts in areas on which very dark color is projected are relatively small. As a result, if the binary image processing based on brightness is adopted, then outlines of the inserted objects may be easily destroyed as shown in (b) of FIG. 10.

Therefore, in a further embodiment of the present invention, it is possible to carry out self-adaptive binary image processing with regard to respective channels, and then the obtained results of the respective channels are combined by a logical OR operation. Object detection results according to this method (as shown in (c) of FIG. 10) are better than those according to the method based on brightness (as shown in (b) of FIG. 10).

Once an inserted object is detected, it is possible to adopt various methods to control interaction between the image generation unit 24 and the calculation unit 21. For example, if a human hand is an inserted object, then a position and a posture of the human hand in a binary image may be further detected; based on the position and the posture, it is possible to further control the calculation unit 21 so as to modify contents generated by the imaging generation unit 24.

Furthermore it is also possible to timely detect the inserted object in the display area of the system while the visual contents change continuously.

In the above described embodiments, color correction is carried out with regard to a generated original image; however, the present invention is not limited to this. It is also possible to carry out the color correction with regard to an actually captured image so as to cause the captured image to be close to an original image. However, since the captured image has been influenced by the display unit 22, the imaging unit 23, and environmental light, etc., an error generated when carrying out the color correction may be relatively big. Furthermore the color correction carried out with regard to the captured image may cause an image obtained by carrying out binary image processing to generate noise-like segment effects that may result in reducing the accuracy of the object detection.

Finally, by referring to FIG. 11, an example of a hardware configuration of a system by which the above described object detection may be carried out is illustrated as follows.

Figure 11:
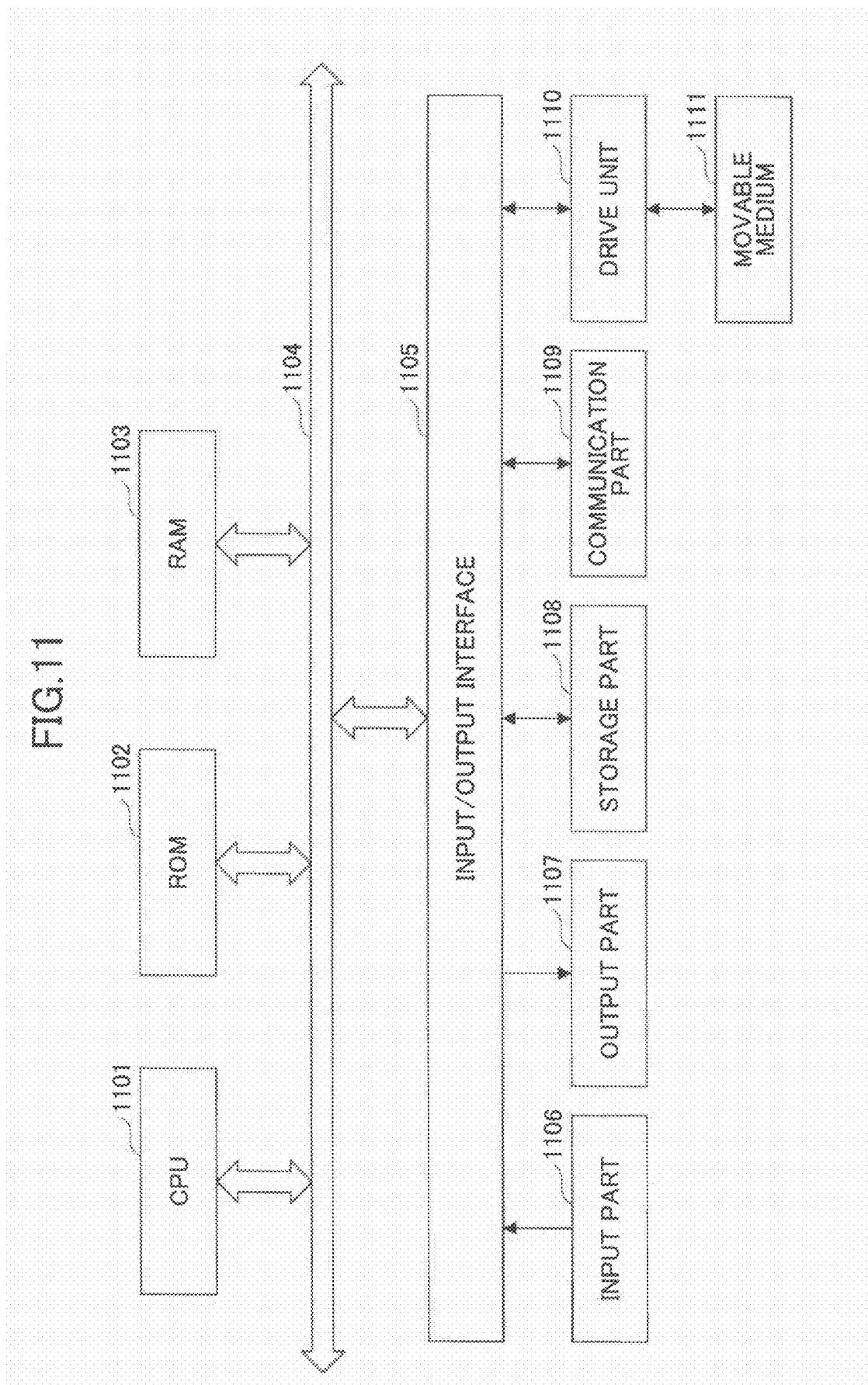
FIG. 11 is a block diagram of a system according to an embodiment of the present invention.

FIG. 11 is a block diagram of a system used in an embodiment of the present invention.

As shown in FIG. 11, a central processing unit (CPU) 1101 carries out various processing based on programs stored in a read-only memory (ROM) 1102 or a storage part 1108. For example, the CPU 1101 executes a program for comparing the generated original image with the actually captured image described in the above embodiments. A random access memory (RAM) 1103 stores programs, data, etc. executed by the CPU 1101. The CPU 1101, the ROM 1102, and the RAM 1103 are connected via a bus 1104.

The CPU 1101 is connected to an input/output interface 1105. An input part 1106 including a keyboard, a mouse, a microphone, etc. and an output part 1107 including a monitor, a speaker, etc. are connected to the input/output interface 1105. The CPU 1101 executes the various processing based on instructions input from the input part 1106, and outputs results to the output part 1107.

The storage part 1108 connected to the input/output interface 1105 includes, for example, a hard disk, and stores the programs and various data executed by the CPU 1101. A communication part 1109 communicates with external devices via, for example, the Internet, a local area network, etc.

A drive unit 1110 connected to the input/output interface 1105 drives a movable medium 1111 such as a hard disk, an optical disk, a magneto-optical disk, a semiconductor memory, etc., and obtains programs and data recorded therein. The obtained programs and data, when needed, are sent to the storage part 1108, and are stored therein.

Up to here, the basic principle of the present invention has been illustrated based on the above described embodiments. However, it should be noted that those skilled in the art may understand that all or parts of the method and the device in the embodiments of the present invention may be achieved by hardware, firmware, software, or their combination in any calculation devices (including processors, storage units, etc.) or networks having the calculation devices. This can be realized by those skilled in the art based on using their basic programming skills after reading the specification.

Therefore the aim of the present invention may be achieved by executing a program or a set of programs in any calculation devices. The calculation devices may be any known common devices. In addition, the aim of the present invention may also be achieved only by providing program products including program codes for realizing the method or the function of the device. In other words, these kinds of program products may make up the present invention, and storage media storing these kinds of program products may make up the present invention too. It is apparent that the storage media may be any known storage media or any storage media that will be developed in the future.

Furthermore it should be noted that in the method and the device of the embodiments of the present invention, it is apparent that the various steps or the various units may be disassembled and/or recombined. These kinds of disassembly and/or recombination should be considered equivalent proposals of the present invention. In addition, the steps in the method of the embodiments of the present invention may be naturally carried out according to the illustrated order in time; however, it is not always necessary to carry out the steps in a time order. Some steps may be carried out in parallel or independently; for example, the step of carrying out color correction with regard to original visual contents and the step of carrying out geometric correction with regard to the actually captured image may be executed in a time order, in parallel, or independently in any order.

While the present invention is described with reference to the specific embodiments chosen for purpose of illustration, it should be apparent that the present invention is not limited to these embodiments, but numerous modifications could be made thereto by those skilled in the art without departing from the basic concept and scope of the present invention.

The present application is based on Chinese Priority Patent Application No. 201010218150.1 filed on Jul. 6, 2010, the entire contents of which are hereby incorporated by reference.

What is claimed is:
1. A method of detecting an object superimposed on a display area of a screen, the method comprising:
generating an image to be displayed;
displaying the generated image on the screen;

obtaining a captured image of the screen including the display area, the captured image of the screen being captured when the generated image is displayed on the screen; and comparing, by a processor, the generated image with the captured image so as to detect the object superimposed on the display area of the screen, wherein, the comparing further comprises:

correcting color of the generated image by using at least one of the following parameters:

a black offset representing a captured non-all-black image when the generated image is all black;

a screen unevenness degree representing an unevenness degree of the captured image when the generated image is even; and a channel brightness response representing a correspondence relationship between a brightness of the generated image and a brightness of the captured image.

2. The method according to claim 1, wherein:

the black offset is calculated by generating an all-zero image;

the screen unevenness degree is calculated by generating at least one one-channel maximum brightness image; and the channel brightness response is calculated by generating at least one one-channel grayscale image.

3. The method according to claim 1, wherein:

the unevenness degree of the captured image is simulated by multiplying the generated image by the screen unevenness degree.

4. The method according to claim 1, wherein:

the channel brightness response is represented in a continuous or discrete manner.

5. The method according to claim 1, wherein:

the screen unevenness degree and the channel rightness response are correlated with one channel or three channels.

6. The method according to claim 1, wherein, when each of the black offset, the screen unevenness degree, and the channel brightness response are utilized, the color of the generated image is corrected by the following steps:

applying the channel brightness response to the generated image;

multiplying an image obtained in the applying step by the screen unevenness degree; and adding the black offset into an image obtained in the multiplying step.

7. The method according to claim 1, wherein the comparing step further comprises:

carrying out binary image processing based on respective channels, and combining results of the binary image processing carried out based on the respective channels by using a logical OR operation.

8. The method according to claim 1, further comprising:

triggering a predetermined event based on a property of the detected object.

9. A device for detecting an object superimposed on a display area of a screen, the device comprising:

an image generation unit configured to generate an image to be displayed;

a display configured to display the generated image on a screen, a an image capture unit configured to obtain captured image of the screen including the display area, the captured image of the screen being captured when the generated image is displayed on the screen; and a calculation unit configured to compare the generated image with the captured image so as to detect the object superimposed on the display area, wherein, the calculation unit further configured to:

correct color of the generated image by using at least one of the following parameters:

a black offset representing a captured non-all-black image when the generated image is all black;

a screen unevenness degree representing an unevenness degree of the captured image when the generated image is even; and a channel brightness response representing a correspondence relationship between a brightness of the generated image and a brightness of the captured image.

10. A non-transitory computer-readable medium having machine-executable instructions for execution by a processing system, wherein, the machine-executable instructions are used for carrying out a method of detecting an object superimposed on a display area of a screen, and the machine-executable instructions, when executed, cause the processing system to carry out the following steps:

generating an image to be displayed;

displaying the generated image on a screen;

obtaining a captured image of the screen including the display area, the captured image of the screen being captured when the generated image is displayed on the screen; and comparing the generated image with the captured image so as to detect the object in superimposed on the display area, wherein, the comparing step further comprises:

correcting color of the generated image by using at least one of the following parameters:

a black offset representing a captured non-all-black image when the generated image is all black;

a screen unevenness degree representing an unevenness degree of the captured image when the generated image is even; and a channel brightness response representing a correspondence relationship between a brightness of the generated image and a brightness of the captured image.

11. The device of claim 9, wherein the display is one of a projection screen and a flat-panel display.

* * * * *